United States Patent [19]
Jones et al.

[11] 3,955,031
[45] May 4, 1976

[54] FLAME RESISTANT BUILDING MATERIAL

[75] Inventors: Isaac Palmer Jones, Granville; Daniel A. McCartan, Heath, both of Ohio

[73] Assignee: Owens-Corning Fiberglas Corporation, Toledo, Ohio

[22] Filed: Feb. 4, 1974

[21] Appl. No.: 439,472

Related U.S. Application Data

[63] Continuation-in-part of Ser. No. 324,616, Jan. 18, 1973, abandoned.

[52] U.S. Cl. .............................. 428/288; 156/306; 428/337; 428/342; 428/442; 428/537
[51] Int. Cl.² .................. B32B 17/10; B32B 17/12
[58] Field of Search .......... 161/200, 204, 250, 251, 161/403, 151, 156, 146; 156/41, 62.4; 181/33, 33.1, 33.11; 162/109, 120, 159; 117/135, 136, 137; 428/537, 288, 289–290

[56] References Cited
UNITED STATES PATENTS

| | | | |
|---|---|---|---|
| 2,045,139 | 6/1936 | Hochstetter | 117/137 |
| 2,813,046 | 11/1957 | Lauring | 117/137 |
| 2,961,342 | 11/1960 | Snyder | 117/68 |
| 2,984,640 | 5/1961 | Kaplan et al. | 117/136 |
| 2,985,540 | 5/1961 | Goldbeck | 117/137 |
| 3,050,424 | 8/1962 | Schmitt | 161/146 |
| 3,132,041 | 5/1964 | Pihl | 117/76 P |
| 3,141,809 | 7/1964 | Di Maio et al. | 161/73 |
| 3,144,376 | 8/1964 | Plumberg et al. | 161/160 |
| 3,745,192 | 7/1973 | Wingler et al. | 117/137 |

FOREIGN PATENTS OR APPLICATIONS
| | | | |
|---|---|---|---|
| 649,539 | 10/1962 | Canada | 117/76 P |

OTHER PUBLICATIONS
Fiberglas Insulation for Industry (Received Aug. 1949), pp. 3 and 10 cited.

*Primary Examiner*—George F. Lesmes
*Assistant Examiner*—R. J. Roche
*Attorney, Agent, or Firm*—John W. Overman; Patrick P. Pacella

[57] ABSTRACT

Building materials of the type containing an impermeable membrane, as for example, an insulation material, or a wall board, or ceiling tile are provided. The impermeable membrane is first formed upon a sheet of paper which gives structural rigidity to the membrane, and is then used as an adhesive to hold the paper onto a porous body by heating the membrane to a softened condition and pressing it against the porous body. The membrane is preferably made in two steps wherein a first application of a thermoplastic latex is put on the paper and then a second application of latex is applied to seal pores in the film produced by the first application of latex. A fire retardant i.e. either a flame retardant salt in the paper or a halogen liberating resin coating on the outside surface is provided to liberate flame extinguishing gases to be held in place by the vapor barrier. In the most preferred embodiments, a halogen containing thermoplastic resin is used as at least part of the material forming the vapor barrier and either another coating of a halogen containing resin is applied to the outside surface of the paper, or a flame retarding salt is included in the paper to produce a building material whose surface has an exceedingly low flame propagation rate.

2 Claims, 4 Drawing Figures

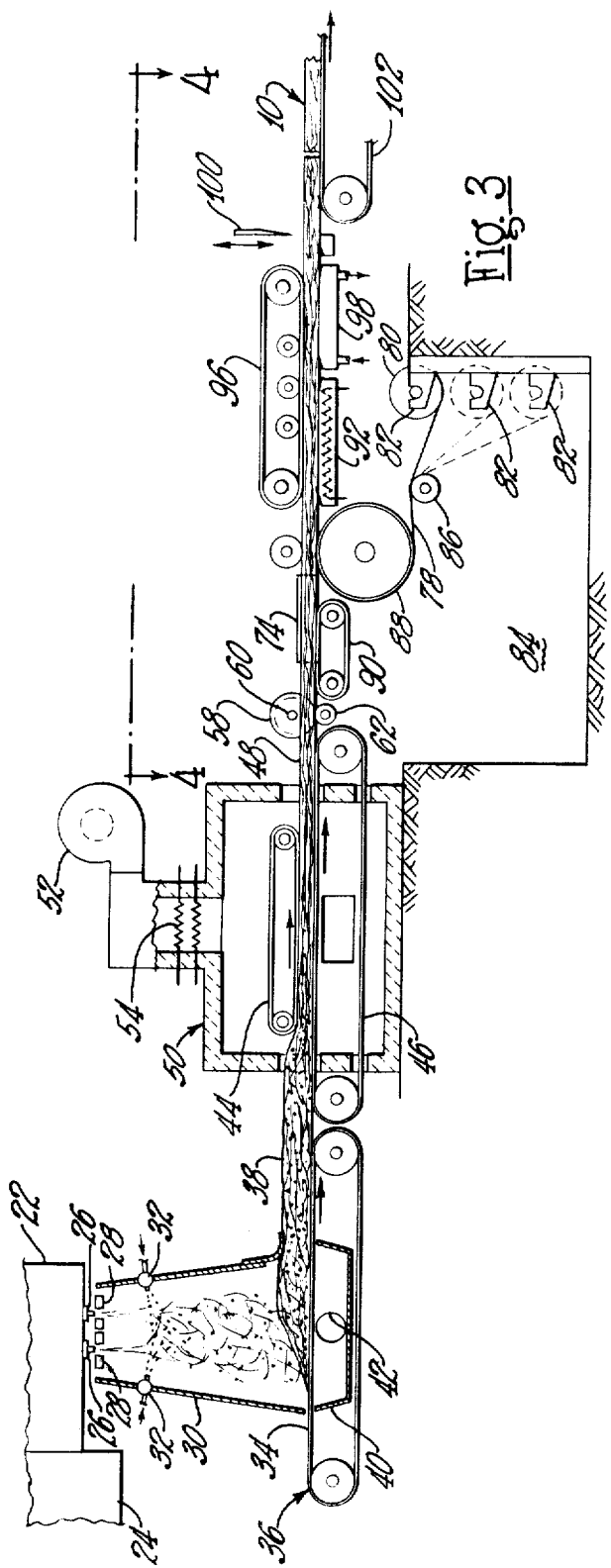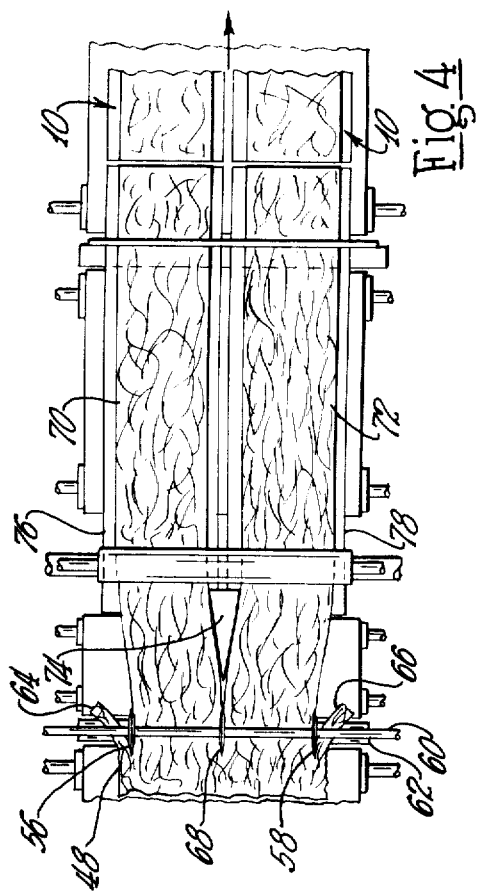

FLAME RESISTANT BUILDING MATERIAL

RELATED APPLICATIONS

The present application is a continuation-in-part of our copending application Ser. No. 324,616, filed Jan. 18, 1973 now abandoned.

BACKGROUND OF THE INVENTION

The present invention relates to porous building materials having a surface thereon that is reinforced by paper. Such materials commonly include a vapor barrier, and in all successful materials heretofore, the vapor barrier has been applied to the outside surface of the paper usually in the form of a metal foil. The metal foil was used heretofore, not only to provide a vapor barrier, but also to provide a protection against the spread of a flame caused to impinge upon the outside surface of the building material.

It is possible that other constructions of building insulation materials have been proposed heretofore, and with which we are not aware. Regardless of any such proposal, however, it is an object of the present invention to provide a new and improved method of providing a vapor barrier in building materials, as for example, insulation, wall board, ceiling boards, etc..

Another object of the present invention is the provision of new and improved building materials, as for example, an insulation material, a wall board or ceiling board having an impermeable membrane therein and which greatly and inexpensively reduces the flame spread rate of the surface of the materials.

Another object of the invention is the provision of a new and improved building material wherein the impermeable membrane is positioned between the main body portion of the building material and an outside protective paper layer.

Other objects and advantages of the present invention will become apparent to those skilled in the art to which the invention relates from the following description of several preferred embodiments described with reference to the accompanying drawings.

BRIEF DESCRIPTION OF THE DRAWINGS

FIG. 3 is a somewhat schematic side view in elevation, with parts broken away and with parts in section, of a manufacturing line for producing the building insulation; and FIG. 4 is a fragmentary view of the manufacturing line of FIG. 3, taken along the line 4—4 thereof.

DESCRIPTION OF THE PREFERRED EMBODIMENTS

According to one aspect of the present invention, it has been discovered that an impermeable membrane can first be built up upon a sheet of paper from a thermoplastic resin and this membrane can thereafter be used to secure the paper layer to the main body portion of the building material. According to another aspect of the invention, it has been discovered that when either a flame retardant salt is provided in the paper or a halogen containing thermoplastic is provided on the exposed face of the paper a great reduction in flame spread rate is achieved. All the reasons why this is so is not fully known, but it is believed that the impervious membrane behind the paper, holds flame extinguishing vapors around the fibers of the paper. This effect seems to be true even when the paper is torn and the membrane pierced at a number of places. It appears that flame reaching the back side of the impervious membrane through these openings, particularly where the membrane is self-extinguishing, encounters a stagnant layer of gas along the back side of the impervious membrane which greatly retards the melting or burning of the membrane, so that the membrane in turn retards further advance of the flame. On the other hand, the fibers of the paper seem to trap either flame retardant salt vapors or halogen vapors from coatings applied to the outside surface of the paper, since the membrane is impervious, so that a greatly improved product is provided by having the membrane on the back side of the paper layer. The above described functioning and advantages were not visualized or apparent, before tests of the material were made.

It has been discovered that a trifunctional membrane can be produced when it is positioned between the paper and the main body portion of the building material. This membrane is trifunctional in the sense that it provides a vapor barrier, it reduces the flame propagation rate along the surface of the paper, and at the same time adheres the paper to the main body portion of the building material.

Figure 1:
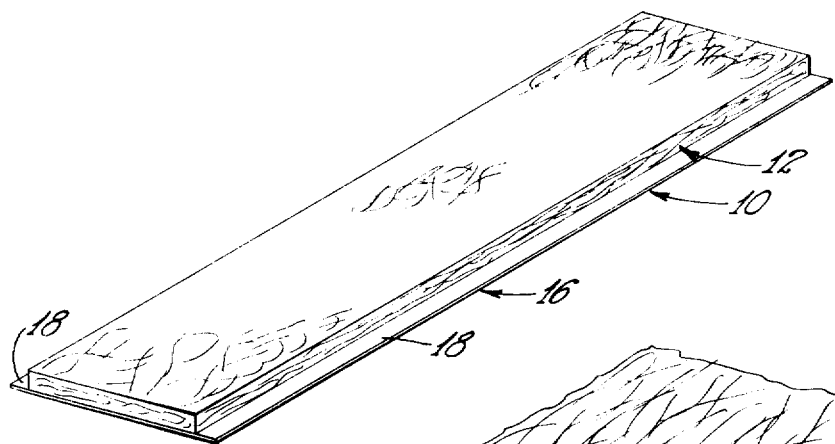
FIG. 1 is a somewhat schematic view in perspective of building insulation embodying the invention.
Figure 2:
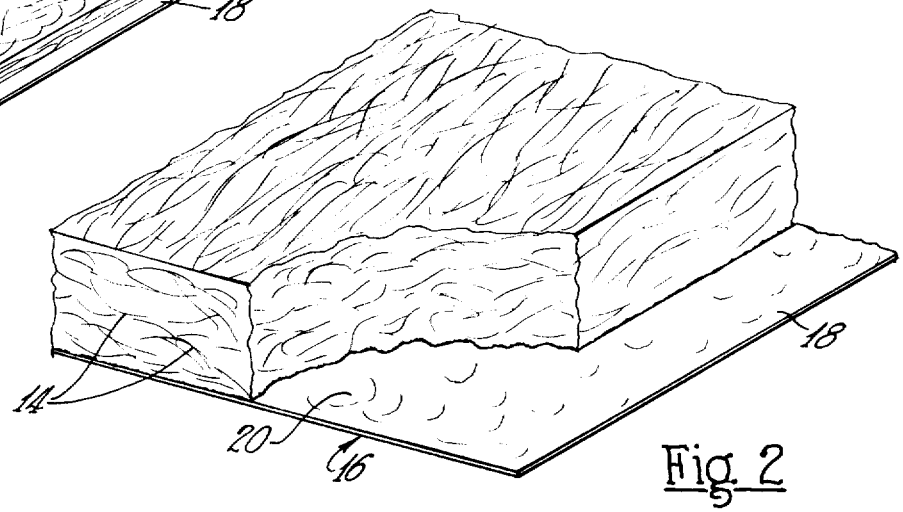
FIG. 2 is a greatly enlarged view, with parts broken away, of a portion of the insulation of FIG. 1.

Referring to FIGS. 1 and 2, building insulation embodying the invention is indicated at 10 and includes a batt 12 of long staple fibers 14, preferably of mineral wool and more particularly of fine glass fibers. A sheet 16 of kraft paper is adhered to a major surface of the batt 12 and will be on the inside surface of the batt 12 when installed in a building wall. The sheet 16 is affixed to wall studs and preferably to the inside edges thereof through edge flaps or tabs 18 which extend transversely beyond the longitudinal edges of the batt 12. The edge flaps 18 can be doubled over, if desired, to provide additional strength. In addition to providing support for the batt 12, the sheet 16 aids in the handling of the batt and provides structural integrity therefor. The paper sheet 16 is relatively inexpensive compared to foil heretofore used but does not provide an inherent vapor barrier or fire retardant, unless it is specially treated.

A coating 20 on the sheet 16 is applied in a thickness of only two to three mils. This thickness is sufficient to provide a good bond between the batt 12 and the sheet 16 and also to provide an effective vapor barrier for the insulation 10. At the same time, a minimum amount of the coating material is employed to achieve low cost. The coating provides an effective vapor barrier for the entire sheet 16 so that when the installation is installed between studs with the flaps 18 affixed to the inner edge of the studs in either contiguous or overlapping relationship with flaps of adjacent insulation, an effective vapor barrier is achieved for the entire wall. Vapor or moisture is thereby kept out of the interior of the wall and it is also retained within the building, which is particularly desirable in winter with the low humidity inherent in heated buildings.

The coating 20 also provides fire protection for the insulation 10 whether or not the paper sheet 16 is treated for fire resistance and whether or not the coating 20 is self-extinguishing. The fibrous batt 12 itself has good fire resistance since the glass fibers do not burn and the binder at most will tend to char if subjected to flame, so that at the most, only a punking action results. Untreated paper tends to burn under ordinary circumstances, but the nonporous coating 20, however, even when of a combustible material reduces the rate of flame spread of the surface. However, the coating 20 of the preferred embodiments of the invention also is fire resistant and this greatly reduces the rate of flame propagation. A coating of a vinylidene chloride is very effective. The combination of 50% by weight of polyvinyl chloride and 50% by weight of vinylidene chloride is almost as effective and achieves a class I fire rating. Chlorinated thermoplastic polymers give off chlorine, when subjected to flame, thereby greatly retarding advance of the flame. Satisfactory results can also be achieved using 50% by weight of vinylidene chloride and 50% by weight of a butadiene-styrene copolymer, and this combination is, of course, much cheaper.

The coating 20 also constitutes a heat-activated adhesive which provides an effective bond between the sheet and the fibrous batt, when heated. However, until heated, the sheet 16 with the coating 20 can be easily handled and can be formed into a roll for easy storage. Further, after the sheet and coating are heated and applied to the fibrous batt, they can be cooled to provide permanent adhesion. The insulation can then be cut to the desired length without the adhesive interfering with the severing operation.

The insulation 10 can be made in one overall manufacturing operation, on one line, with the apparatus shown in FIGS. 3 and 4. Accordingly, a forehearth 22 receives heat-softened glass or other flowable, fiber-forming material from a melting furnace 24 of a suitable, known design in which raw material is reduced to a flowable or molten state. The molten glass is fed to fiber-forming units 26 located beneath the forehearth 22. These, by way of example, can be hollow rotatable members or spinners having orifices in the peripheries through which the glass is attenuated into primary fibers. The primary fibers are then further attenuated and directed downwardly by hot gaseous blasts from blowers or burners indicated at 28. The fibers move downwardly through a forming hood 30 and are sprayed with binder from suitable spray devices 32. The fibers are then received on an upper flight or run 34 of a foraminous endless belt conveyor 36, the fibers being collected in a mass or layer 38 of a generally predetermined thickness and carried along the conveyor 36 toward the right, as viewed in FIG. 3. A suction chamber 40 is located below the upper flight 34 of the conveyor with an exhaust conduit 42 connected to a suction blower (not shown) for establishing a reduced pressure in the chamber 40. The reduced pressure or suction assists in the collection of the fibers on the conveyor flight 34 and also carries away the spent gases of the attenuating blasts and organic particles from the binder.

The layer 38 of fibers is advanced to a region between upper and lower foraminous belts 44 and 46 which are positioned to compress the fibers into a self-sustaining layer or fibrous body 48 of predetermined thickness. The foraminous belts 44 and 46 convey the fibers through an oven or heating chamber 50 in which the binder is set or cured on the fibers at a temperature in the order of 450°-500°F. This is achieved by air supplied from a blower 52 and heated by elements 54, in this instance. When the layer 48 emerges from the oven 50, the fibers are bonded permanently into the layer form.

When the layer 48 emerges from the oven 50, the edges are trimmed by outer rotatable knives 56 and 58 located on a shaft 60 above a back-up roll 62, which knives remove uneven edge strips 64 and 66. A center rotatable knife 68 severs the formed layer 48 into two narrow fibrous layers 70 and 72 of predetermined, narrower width, and a plow 74 then spreads apart the narrow layers 70 and 72 to produce a space therebetween. At this time, the coated kraft paper can be applied to the narrow layers 70 and 72. Strips 76 and 78 of kraft paper are fed from supply rolls 80 which are rotatably supported on brackets 82 located in a pit 84 beneath the production line. The strips 76 and 78 are pulled over a guide roll 86 and around a large roller 88 which can be heated to heat the strips 76 and 78 and to activate the coating thereon. The strips extend around substantially half the circumference of the large roller 88 so as to be in contact with it for a sufficient time to transfer heat thereto. The roller 88 can be at a temperature of 350°F. to 550°F., for example, to heat the paper and adhesive to a temperature of 180°F. to 300°F., which is necessary to soften and activate the coating. The fibrous layers retain a substantial amount of heat from the ovens 50 which help to activate the adhesive along with the strips 76 and 78 being heated.

The strips 76 and 78 contact the lower surfaces of the narrow layers 70 and 72 beyond a short conveyor 90 located under the plow 74. The strips 76 and 78 then move over a heated plate 92 above which is a belt conveyor 96 which temporarily compresses the layers 70 and 72 to provide good contact between the fibers of the layers and the coatings on the strips 76 and 78. Whether or not the plate 92 is heated will depend on whether the coating can reach the activating temperature in the time the paper is in contact with the large roller 88. It is also possible that the heat from the plate 92 will be sufficient to activate the adhesive without heating the roller 88. Further, radiant heat can be used alone or with the other sources to provide the necessary temperature for the adhesive.

The combined layers 70 and 72 and the strips 76 and 78 can be cooled prior to being cut to length and packaged. This can be accomplished by a water-cooled plate 98 located just downstream of the heated plate 92 and spaced slightly therefrom. By cooling the paper strips 76 and 78 and the coating thereon, the coating will now interfere with the severing operation when the layers 70 and 72 and the strips 76 and 78 are cut to length by a suitable knife 100 which provides the finished insulation 10, as shown in FIG. 1. The finished insulation can then be carried away by a suitable conveyor 102 and packaged.

In the procedure above described, a kraft paper was used weighing 35 lbs. per 3,000 sq. feet. The paper was impregnated with an ammonium sulfate flame retardant at the rate of 6 lbs. per 3,000 sq. feet. This paper was then given a first coating of 9.1 lbs. of solids of a 50-50 blend of a polyvinylidene chloride latex amd a polybutadiene-styrene copolymer latex followed by a second coating of the blend to provide an additional 5.2 lbs. of solids per 3,000 sq. feet. The coating was done in a conventional coater using an air knife to control the amount of the latex applied, and the coated paper was dried after each coating. The drying procedure left a porous first coating, and therefore a second coating of the polyvinylidene chloride latex blend was applied. Upon drying a substantially impervious coating was produced. This is remarkable since a single application of latex to give 14.3 lbs. per 3,000 sq. feet of solids has a vapor trasmission rate of more than one perm whereas the double coated paper described had a vapor transmission rate of only 0.2 perms. The coated paper, produced as above described, was heat sealed upon the face of a 3 ½ inch thick batt of glass fibers having a density of 0.5 lbs. per cubic foot and was tested in the roof of a fire test tunnel constructed in accordance with the ASTM Specification E 84–70. The insulation material has a flame transmission rate of only 18.

In other tests which have been made, a 35 lb. kraft paper that did not contain a flame retardant was coated with a first coating of the latex blend at a rate of 7.5 lbs. per 3,000 sq. feet and dried, and was thereafter given a second application of the latex blend to leave an additional 5.6 lbs. per 3,000 sq. feet. Some of this coated paper was adhered to a glass fiber batt insulation with the coating between the glass fibers and the paper and this material had a flame spread rate of 2063. In another test some of the same coated paper was attached to similar batt type insulation with the coating on the outside of the paper. The paper was attached to the fibers using strips of butadiene-styrene latex which was dried onto the batt insulation as described in Gaston et al. U.S. Pat. No. 3,222,243. This material with the coating on the outside had a flame spread rate of 900. These tests indicate: (1) the advantage of using some halogenated thermoplastic on the exposed surface of the paper, and (2) the inside coating need not necessarily include the halogen.

Fire tests were also made using the flame propagation testing procedure of the Technical Association of the Pulp and Paper Institute (TAPPI standard test T461—os—68) differing only therefrom in that a slightly larger size paper specimen (10 inches × 12 inches) was used and that a larger flame impingement onto the specimen was used. Tests A, B and C were made using this test procedure, and three specimens of paper were used in each test. In Test A, an untreated 35 lb. kraft paper was coated with 16 lbs. of polyvinylidene chloride per 3,000 ft.$^2$ from a latex thereof having 54% solids. After the coating was dried, three specimens of paper (10 inches × 12 inches) were cut from the paper. These specimens were tested one at a time by supporting the specimen vertically in the flame of a Bunson burner for 12 seconds with the flame reaching 2 ½ inches upwardly into the center of a 10 inch wide edge of the paper. All three specimens of Test A were completely consumed with the flame spreading on the uncoated side of the paper. The procedure was repeated for Test B excepting that its three specimens were cut from a 35 lb. kraft that was coated on one side with 22 lbs. per 3,000 ft.$^2$ of the same polyvinylidene chloride material used in Test A. The three specimens of Test B were also completely consumed with the flame spreading on the uncoated side. In Test C a 35 lb. kraft paper was coated with 12 ½ lbs. per 3,000 ft.$^2$ of polyvinylidene chloride on each side of the paper to give a total coating weight of 25 lbs. per 3,000 ft.$^2$. The three specimens which were cut from this paper and flame tested were found to be self-extinguishing. One specimen when removed from the flame had a char length upwardly of 5 ¼ inch; a second specimen had a char length upwardly of 4 7/8 inches; and the other specimen had a char length upwardly of 5 ⅛ inches. This series of tests clearly indicates the resistance of flame propagation that is imparted by halogen-containing coatings on both sides of the paper.

In another satisfactory test, a 35 lb. kraft untreated paper was coated with a first application of a polybutadiene-styrene latex to give 3.0 lbs. of solids per 3,000 ft.$^2$ followed by a second coating of a polyvinylidene chloride latex to give 3.0 lbs. of solids per 3,000 sq. feet. This arrangement had a vapor transmission rate of less than 1 perm.

It is known that any halogen and particularly chlorine, bromine, and iodine are effective as flame retardants when incorporated into thermoplastic materials. It would be obvious, therefore, that any thermoplastic material that contains a halogen, as for example, chlorine, bromine, and iodine can be used as the material of the coating. Suitable halogenated thermoplastics will, of course, include polyvinyl chloride, polyvinylidene fluoride, brominated polyethylene, and brominated polypropylene.

As shown above, a coating of a halogen-containing thermoplastic to the outside surface of the paper markedly cuts down the flame spread of the building material. This is probably due to the fact that when it is contacted by the flame, it liberates halogen which is caught and held by the porous paper to keep the paper from burning until such time as the halogen is swept away. A vapor barrier on the back side of the paper holds the liberated halogen and/or flame retardant salts in place.

A preferred inexpensive product is made using paper untreated with flame retardant salts, but having a vapor barrier of a halogen-containing self extinguishing thermoplastic adhered to the fiber body, and sufficient halogen-containing self-extinguishing thermoplastic on the exposed surface to give good fire retardancy.

In some instances, flame retardant salts with which the paper is impregnated, and particularly water soluble salts, lose some of their effectiveness as a flame retardant through weathering, probably due to a re-crystallization of the flame retardant salts. It has further been found that a coating on the outside of the paper, in addition to the vapor barrier on the inside of the paper, greatly cuts down the weathering affect of the flame retardant salts to make the salts effective practically indefinitely.

It will be seen that the paper is used to perform several functions, one of which is to support an impermeable coating and make it possible to produce the coating from one or more applications of a latex or emulsion. Another function of the paper is to reinforce the insulation and provide a strong backing by which the insulation can be handled, compression-packaged, shipped, and later firmly nailed in place between the studs of buildings. The necessary strength can be achieved in one or more layers of the paper. For example, a glassine paper or a thin kraft paper, as for example, a 20 lb. kraft can be coated with a sufficient quantity of latex to provide an impermeable membrane and then sealed to another layer of glassine or thin kraft paper, as for example, a 20 lb. kraft. This composite can be adhered to the glass fibers using any suitable type of adhesive since the impermeable layer has already been provided between the layers of paper. With such an arrangement, a flame retardant in only one of the layers of paper will be effective, and in those instances where the insulation material will not be subjected to weathering, the flame retardant can be in the outside layer. In those instances where the insulation will be subjected to weathering, the flame retardant might better be used in the inside layer of paper.

It will now be seen that the coating arrangements of the present invention will have still other uses, as for example, in a facing for wall and/or ceiling board where they can perform the same functions described above, and in addition provide a suitable base for receiving paint or other decorative material. In ceiling board or ceiling tile, for example, the surface of the fiber backing may have a plurality of irregularities or depressions and it is customary to perform a sanding or smoothing operation before the paint is applied. In some instances, it has been suggested that a scrim be applied which would bridge the depressions, and for such an application, the difunctional or trifunctional coated paper above described is ideally suited. In general, insulation materials have a density of from 0.5 lbs. per cubic foot to 3 lbs. per cubic foot depending upon the materials from which they are made and depending upon the degree of compaction that they are subjected to during their manufacture. The coated paper above described will have application as a surfacing for insulation materials of the above identified densities for use as insulation. Ceiling and wall boards are compacted to a much greater degree in order that they will have suitable structural strength, and these boards and tile will usually have a density ranging from 3.0 lbs. per cubic foot to 15 lbs. per cubic foot. The coated paper above described can be adhered to glass fiberboard, or rockwool board formed within the above density range by the heat-sealing process above described. In some instances the paper can be pigmented and heat sealed onto the fiberboard and in other instances a layer of paint comprising an inorganic pigment and an organic binder can be applied after the coated paper is adhered to the fiberboard.

The coated paper of the present invention can also be used as a coating on one side of gypsum wall board. This can be done conveniently after the wall board comes from the finishing oven and while it is at an elevated temperature of from 150° to 180°F so that very little additional heat is required to adhere the coated paper to the gypsum wall board. Where the paper contains a decorative surface it can be adhered to the room-side surface of the gypsum wall board, but regardless of which side of the gypsum wall board it is adhered to, it will provide a very good vapor barrier that is substantially continuous through the expanse formed by the areas covered by the wall board.

In those instances where the vapor barrier is formed by coating the paper with a latex, a two-step coating process with drying between the coatings is preferably used. The first or base coat when dried provides a porous base which strains out solids of the second coat. Using this technique, impervious coatings having low permeability can be made using 4.5 lbs. per 3,000 sq. feet. Very low permeability an be had with a double coating having a total of 6 lbs. per 3,000 sq. feet and optimum results are had using from 9 to 12 lbs. per 3,000 sq. feet. As previously explained, these coatings are preferably produced in two applications each of which are approximately one half of the total amount above described. Good adhesion is also had using the amounts of material above described, particularly the heavier coatings, and no appreciable advantage is had in adhesion, impermeability, or fire retardant using more than approximately 15 lbs. per 3,000 sq. feet of paper.

While the invention has been described in considerable detail, we do not wish to be limited to the particular embodiments above described, and it is our intention to cover hereby all novel adaptations, modifications, and arrangements thereof which come within the practice of those skilled in the art to which the invention relates and which fall within the purview of the following claims.

We claim:

1. A wall or ceiling board comprising: a body of glass fibers having a density between 3 and 15 lbs. per ft.$^3$, a layer of paper weighing from approximately 20 to 50 lbs. per 3000 ft.$^2$, said layer of paper being bounded to said glass fibers by a coating of from 4.5 to 15 lbs. per 3000 ft.$^2$ of a halogen containing self-extinguishing thermoplastic polymeric material, said paper also having a coating on its outer surface of from 4.5 to 15 lbs. per 3000 ft.$^2$ of a halogen containing self-extinguishing thermoplastic polymeric material, one of said coatings having a vapor transmission rate of less than one perm, and whereby the wall or ceiling board has a low flame spread rate when tested in accordance with ASTM Specification E84–70 that is acceptable as a building material.

2. The wall or ceiling board of claim 2 including a layer of inorganic pigment and organic binder on the outer surface of the paper.

* * * * *